United States Patent
Davis et al.

[11] Patent Number: 6,167,462
[45] Date of Patent: Dec. 26, 2000

[54] REMOTE SCANNING THROUGH A COMPUTER SYSTEM NETWORK

[75] Inventors: Kenneth P. Davis, Brighton; Steven D. Hariri, Ft. Collins, both of Colo.

[73] Assignee: Hewlett-Packard Company, Palo Alto, Calif.

[21] Appl. No.: 09/210,553

[22] Filed: Dec. 11, 1998

[51] Int. Cl.[7] .................................................. G06F 13/00
[52] U.S. Cl. .............................................. 710/5; 709/217
[58] Field of Search .............................. 710/1–7, 72–74; 709/217–218, 250, 300–302; 358/400–403, 296; 345/418; 382/376

[56] References Cited

U.S. PATENT DOCUMENTS

| | | | |
|---|---|---|---|
| 4,958,235 | 9/1990 | Sims et al. ............................. | 358/402 |
| 5,058,185 | 10/1991 | Morris et al. ......................... | 382/305 |
| 5,361,134 | 11/1994 | Hu et al. ............................... | 358/296 |
| 5,459,579 | 10/1995 | Hu et al. ............................... | 358/296 |
| 5,615,015 | 3/1997 | Krist et al. ............................ | 358/296 |
| 5,680,223 | 10/1997 | Cooper et al. ........................ | 358/403 |
| 5,867,712 | 2/1999 | Shaw et al. ........................... | 395/704 |
| 6,043,819 | 3/2000 | LeBrun et al. ........................ | 345/418 |

*Primary Examiner*—Christopher B. Shin

[57] ABSTRACT

Network scanner software that accesses scanners over a network to remotely scan a document. Once a scanner is reserved, no other computer system can access the scanner. The computer system to which the scanner is connected changes the appearance of an icon representing the scanner to indicate that the scanner is reserved. If a user of the computer system moves the cursor over the icon, a pop-up window is displayed with the name of the computer system that has the scanner reserved. Once a scanner is reserved, a user may place a document into the scanner, push a button on the scanner, whereupon the scanner scans the document and sends the scanned data to the computer system that reserved the scanner. A user may reserve a scanner, start a timer, and when the timer expires, the document in the scanner is scanned and the data returned to the computer system.

13 Claims, 10 Drawing Sheets

REMOTE SCANNING THROUGH A COMPUTER SYSTEM NETWORK

DISCLOSURE OF THE INVENTION

It is an aspect of the present invention to allow a scanner to be shared on a computer network.

Another aspect of the invention is that the software will only allow one user to access the network scanner at a time.

Another aspect of the invention is that an icon that represents the scanner is overlaid with a red circle if the scanner is in use.

Yet another aspect of the invention is that if a user of the computer system that connects directly to the scanner places the mouse cursor over the icon that represents the scanner, a pop up window appears that displays the name of the computer system that is using the scanner.

A further aspect of the invention is to allow a user to select either a local or remote scanner.

A still further aspect of the invention is that a user can place a document into the scanner, push a button on the scanner, and the scanner will scan the document and send the scanned data to an application program.

Yet another aspect of the invention is to allow a user to set a timer, and perform a scan after the timer expires.

The above and other aspects of the invention are accomplished in network scanner software that communicates with scanners over a computer network linking. A computer connected to the network accesses the remote scanner through remote procedure calls to reserve the scanner, perform scanning operations, and release the scanner.

A user selects a scanner to use for an application, and the application accesses the selected scanner through scanner command language software. Once a scanner is selected, it is reserved to the computer system, so that no other computer system can access the scanner. The computer system to which the scanner is connected places a red circle over an icon representing the scanner to indicate that the scanner is reserved. If a user of the computer system moves the cursor over the icon, a pop-up window is displayed with the name of the computer system that has the scanner reserved.

Once a scanner is reserved, a user may place a document, such as a printed sheet, a picture, or other scannable media, into the scanner, push a button on the scanner, to cause the scanner to scan the document and send the scanned data to the computer system that has the scanner reserved. Also, a user may reserve a scanner, and start a timer. When the timer expires, the document in the scanner is scanned and the data returned to the computer system.

Once a scanner is reserved, a user may place a document into the scanner, and select scan from the client software to cause the scanner to scan the document and return the scanned image to the client computer.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
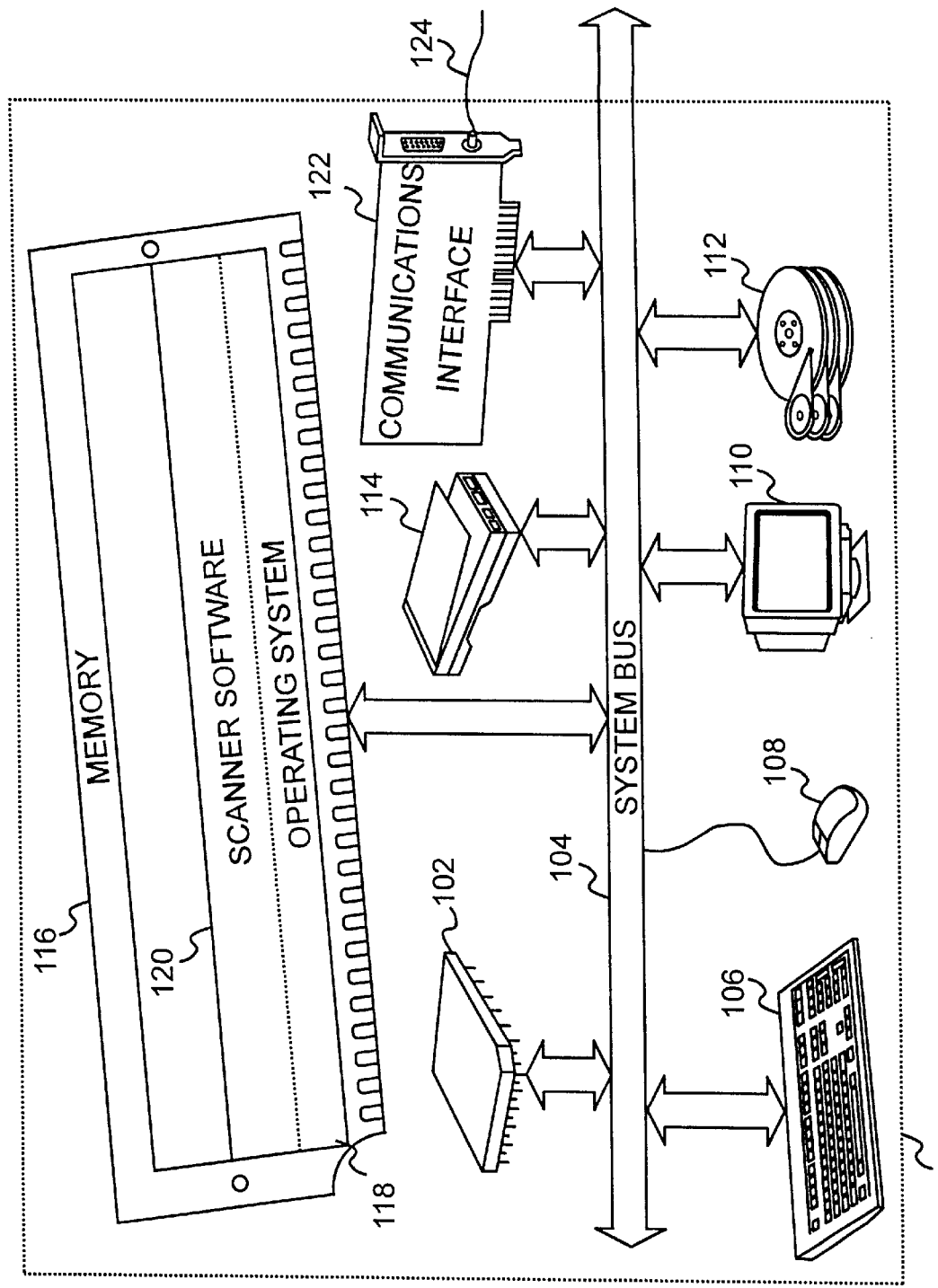
FIG. 1 shows a block diagram of a computer system set up as a client/server incorporating the present invention.

FIG. 1 shows a block diagram of a computer system, set up as a client/server, that incorporates the present invention. Referring to FIG. 1, a computer system 100 contains a processing element 102 which communicates to other elements of the computer system 100 over system bus 104. A keyboard 106 and a mouse device 108 are used to input data to the computer system 100 and data is output by software within the computer system 100 through a graphics display 110. A disk 112 stores the software and data of the present invention. Memory 116 contains an operating system 118, which is typically the Microsoft Windows operating system. Also within the memory 116 is scanner software 120 of the present invention. A scanner 114 is connected to the system bus 104 which allows the scanner software 120 to scan data and either display this data through an application program (not shown) on the graphics display 110, or transfer the data over a communications interface 122 and a network 124 to another system using the remote scanning of the present invention.

Figure 2:
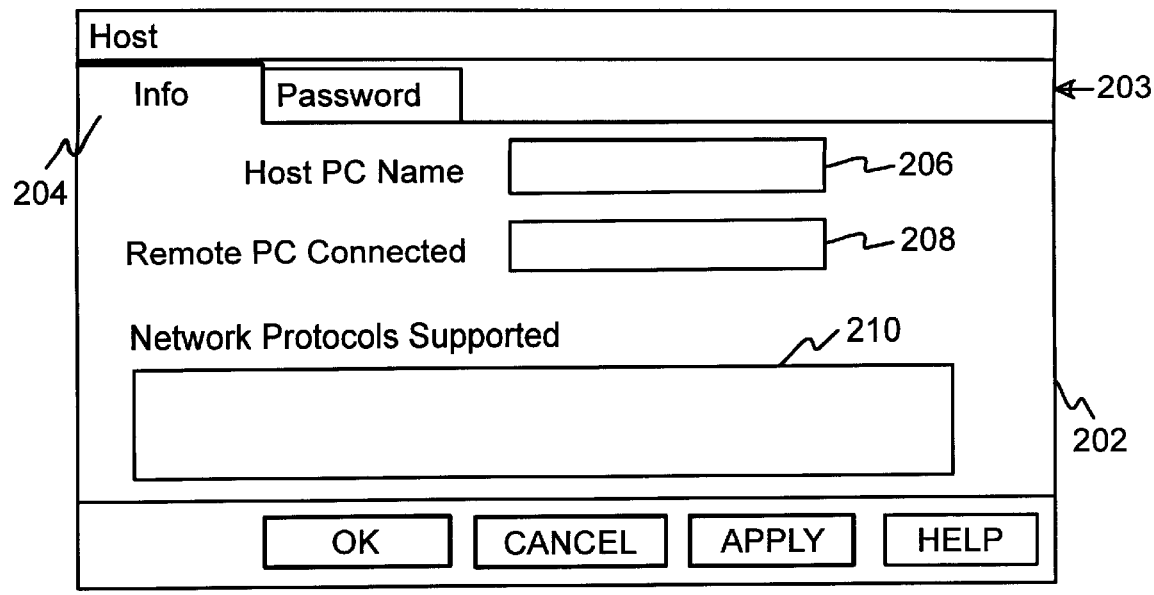
FIGS. 2 and 3 show properties boxes that are used to set up the scanner on a server computer system.
Figure 3:
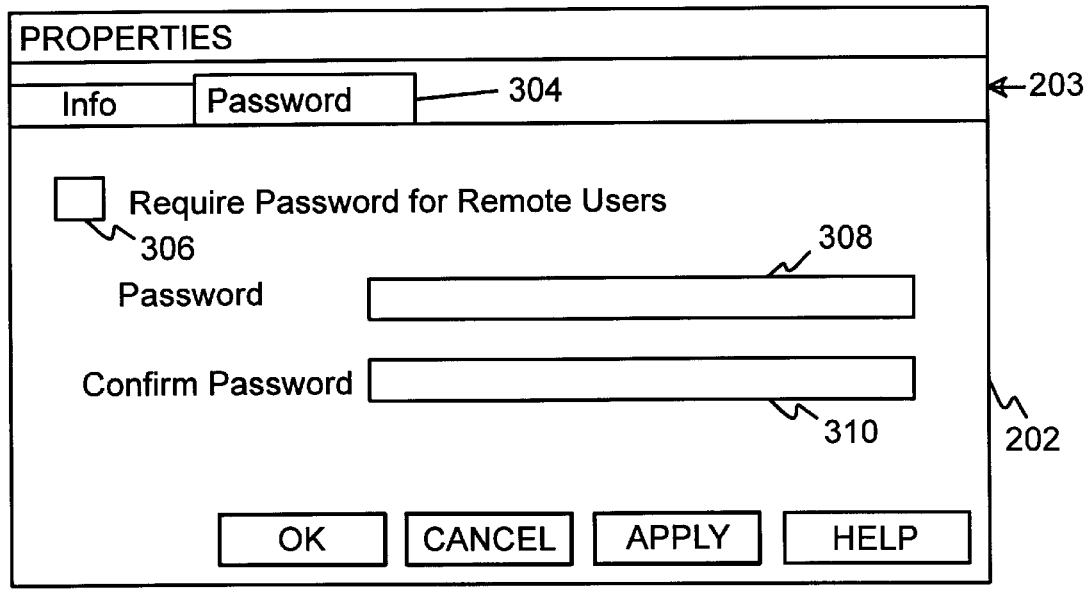

Scanner software 120 allows a user of the computer system 100 to set property values for use in selecting a scanner within the computer system 100 or selecting a remote scanner that is accessed over the network 124. FIGS. 2 and 3 show properties windows that allow the server computer system containing the scanner to be set to allow remote client computer systems to use the scanner. Within FIG. 2, a properties window 202 contains several tabs 203. In the example shown in FIG. 2, the info tab 204 is selected and this tab displays a Host PC Name box 206 which identifies the name of the server PC that contains the scanner 114. Remote PC Connected box 208 shows the name of the remote PC, when a remote PC is connected to the scanner on the server. Network Protocols Supported box 210 show the network protocols that can be used to connnect a client computer system to this server.

FIG. 3 shows the properties window of FIG. 2 with the password tab 304 selected. With this tab selected, a box 306 is available to allow the server to require that the client computer system supply a password before the connection is allowed. Password box 308 and confirm password box 310 are used to specify the password that is required.

Figure 4:
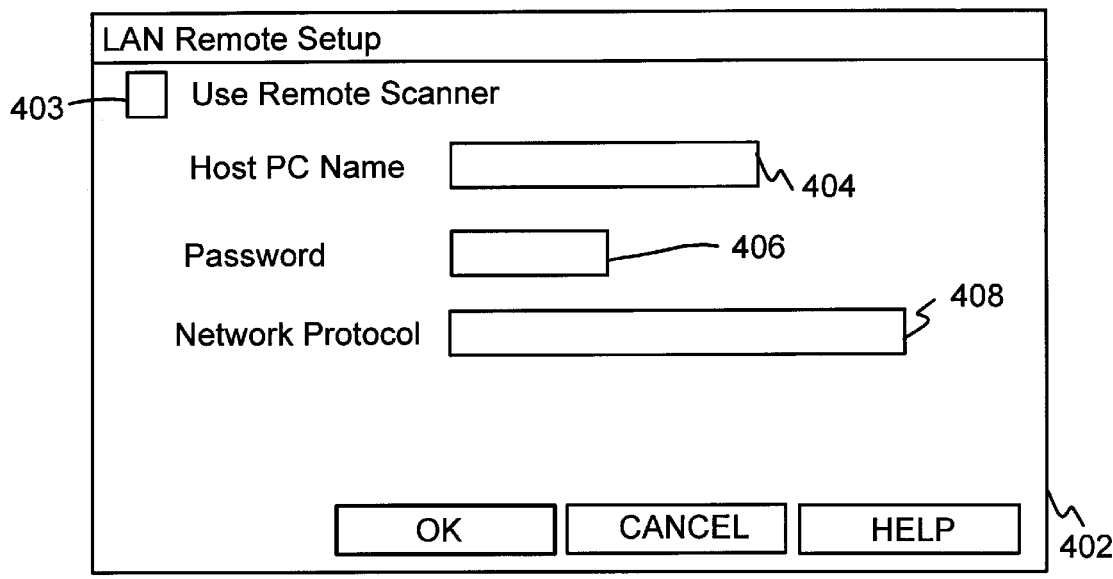
FIG. 4 shows a properties window on a client computer system that allows connection to a remote scanner on a server computer system.

FIG. 4 shows a remote scanner configuration window used to connect to a remote scanner. Referring now to FIG. 4, the remote scanner configuration window 402 contains a check box 403 that specifies that a remote scanner is to be used. A Host PC Name box 404 allows the user to enter the name of the remote computer system that contains the scanner to be used. If the remote scanner requires a password, the user enters the password into the password box 406 and the user identifies the communications protocol being used to connect to the scanner into the protocol box 408.

Figure 5:
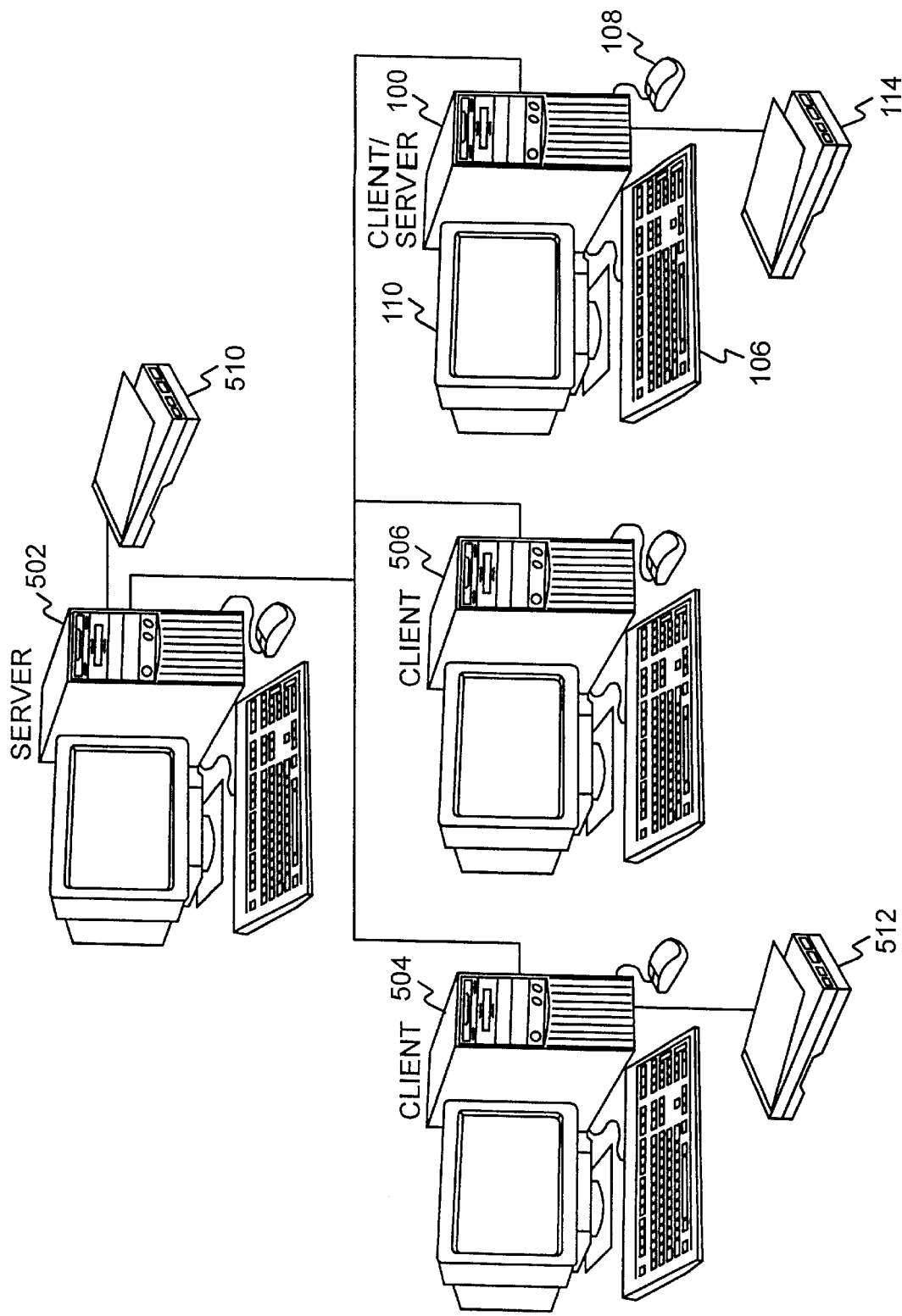
FIG. 5 shows a diagram of a network configuration utilizing the present invention.

FIG. 5 shows a diagram of the network 124 (FIG. 1) and shows other computer systems connected to the network 124. Referring now to FIG. 5, the computer system 100, configured as a client/server computer system is shown connected to the network 124. Also connected to the network 124 is a server computer system 502 which contains a scanner 510. In addition, a client computer system 504 is shown connected to the network with a scanner system 512. A client computer system 506 is shown connected to the computer system, and it has no scanner attached o it. By installing the software of the present invention in each of the computer systems 100, 502, 504, and 506, a user can use either of the scanners 510, or 114.

A user of the computer system 100, can use the local scanner 114, or through the software of the present invention, the user can also scan from the scanner 510 attached to server computer system 502. Because computer system 504 is configured only as a client computer system, scanner 512 cannot be utilized by any computer system on the network except client computer 504.

By installing the software of the present invention within client computer system 504, a user of computer system 504 can access the local scanner 512, or access the remote scanner 510 located on the server computer system 502, or also access the remote scanner 114 located on computer system 100. Similarly, the user of the computer system 506 can utilize the remote scanner 510 located on server computer system 502 or remote scanner 114 located on computer system 100.

Figure 6:
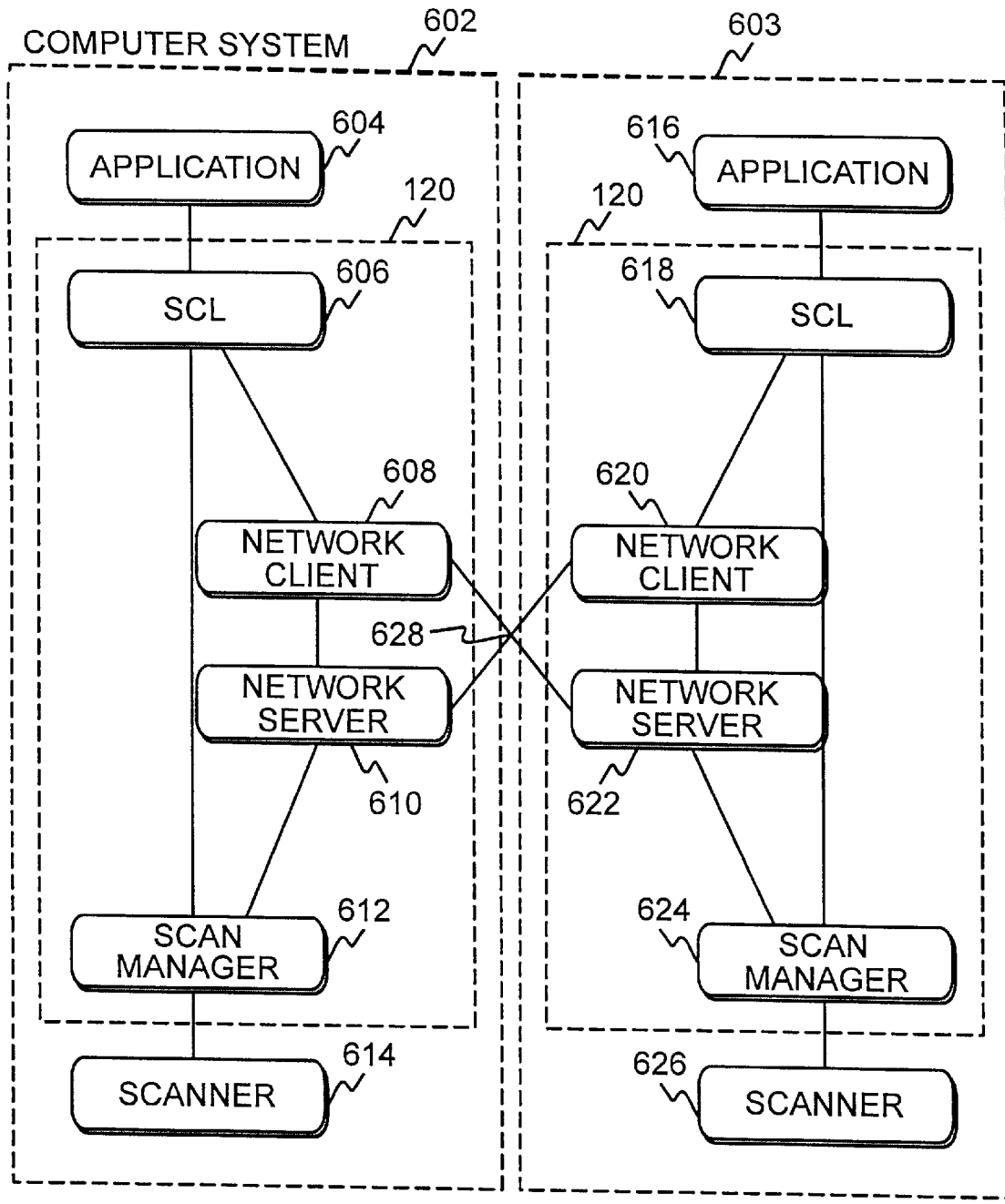
FIG. 6 shows a diagram of the network architecture of the present invention.

FIG. 6 shows a diagram of the network architecture of the present invention. Referring now to FIG. 6, two computer systems, 602 and 603 are shown, each containing an application program, the software of the present invention, and an attached scanner. In this example, the computer systems are mirror images of each other, and both are configured as Client/Server computer systems.

Within computer system 602, prior to starting any application program, the user would select either the local scanner 614 or remote scanner 626 through the properties windows discussed above with respect to FIG. 4. Once the scanner is selected, application program 604 can initiate a scan of a document by calling scanner command library 606. Scanner command library 606 determines whether the user has selected the local scanner 614 or the remote scanner 626. If the local scanner 614 has been selected, scanner command language module 606 sends the command to scan manager module 612 which directly accesses the local scanner 614.

If the user of the computer system 602 has selected the remote scanner 626 for scanning, scanner command language module 606 utilizes the remote procedure call (RPC) facility of the operating system to access the remote scanner 626 over a network 628. A complete description of remote procedure calls can be found in "Network Programming In Windows NT" by Alok K. Sinha, Allison-Wesley Publishing Company, Copyright 1996, chapter 4, pages 115–198. Although the preferred embodiment uses the RPC facility, other remote access facilities could be used.

When using the remote scanner 626, scanner command language module 606 calls network client 608 to perform the operation. Network client module 608 builds the information necessary to perform a remote procedure call, and sends the remote procedure call information over network 628 to network server software 622. Network server software 622 receives the message from network client software 608, unbundles the commands and parameter data from the message, and calls scan manager 624 to actually perform the scanning operation. Scan manager 624 accesses scanner 626, which is local to computer system 604 to perform the scan. After retrieving the data, scan manager 624 returns the data to network server 622. Network server 622 bundles the data into a network message and sends the network message over network 628 to network client software 608. Network client software 608 unbundles the message and returns the results of the operation to scanner command language 606 which in turn returns the results to application 604.

In a similar manner, application program 616 running in computer system 604 can access scanner 614 through scanner command language module 618, network client 620, network server 610 and scan manager 612.

Figure 7:
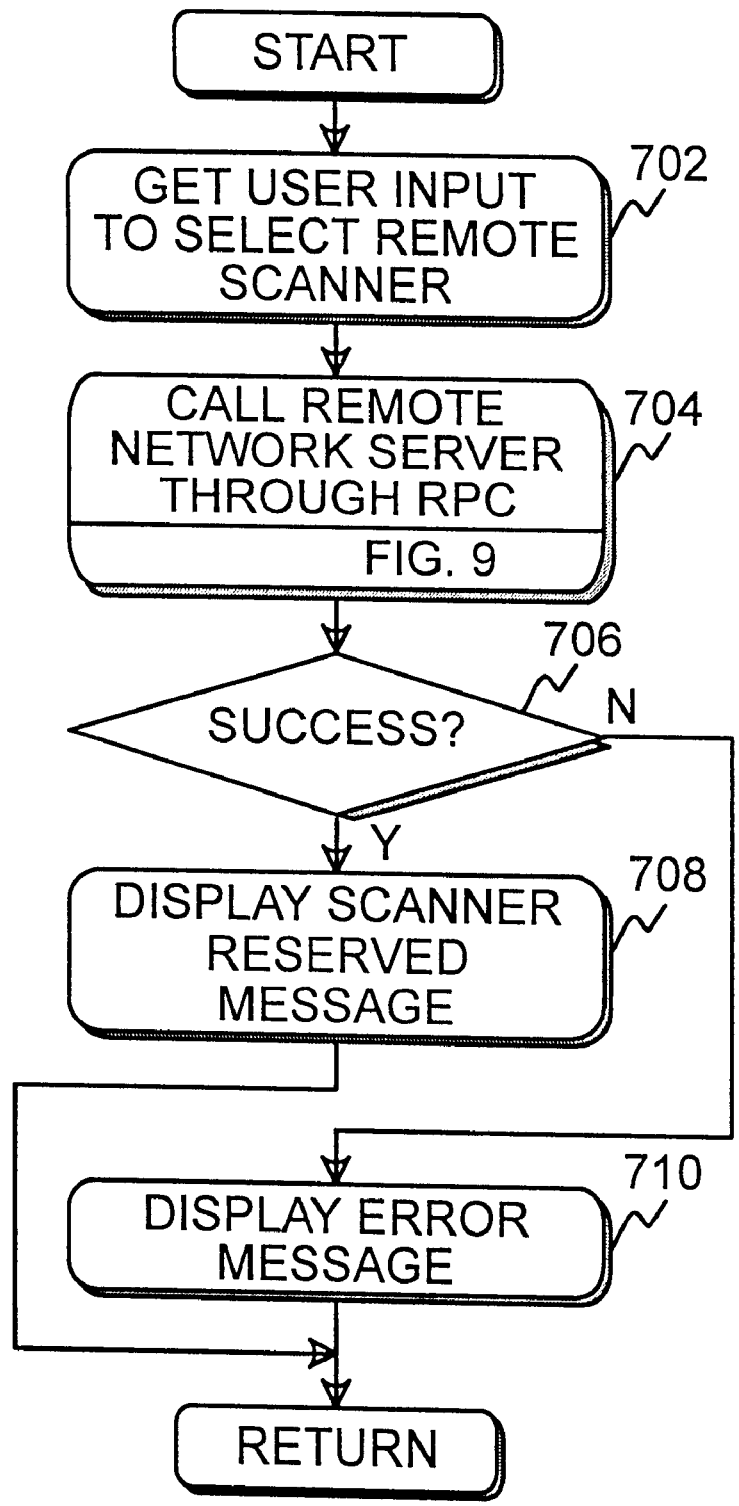
FIG. 7 shows a flowchart of the reserve scanner process on the client computer system.
Figure 8:
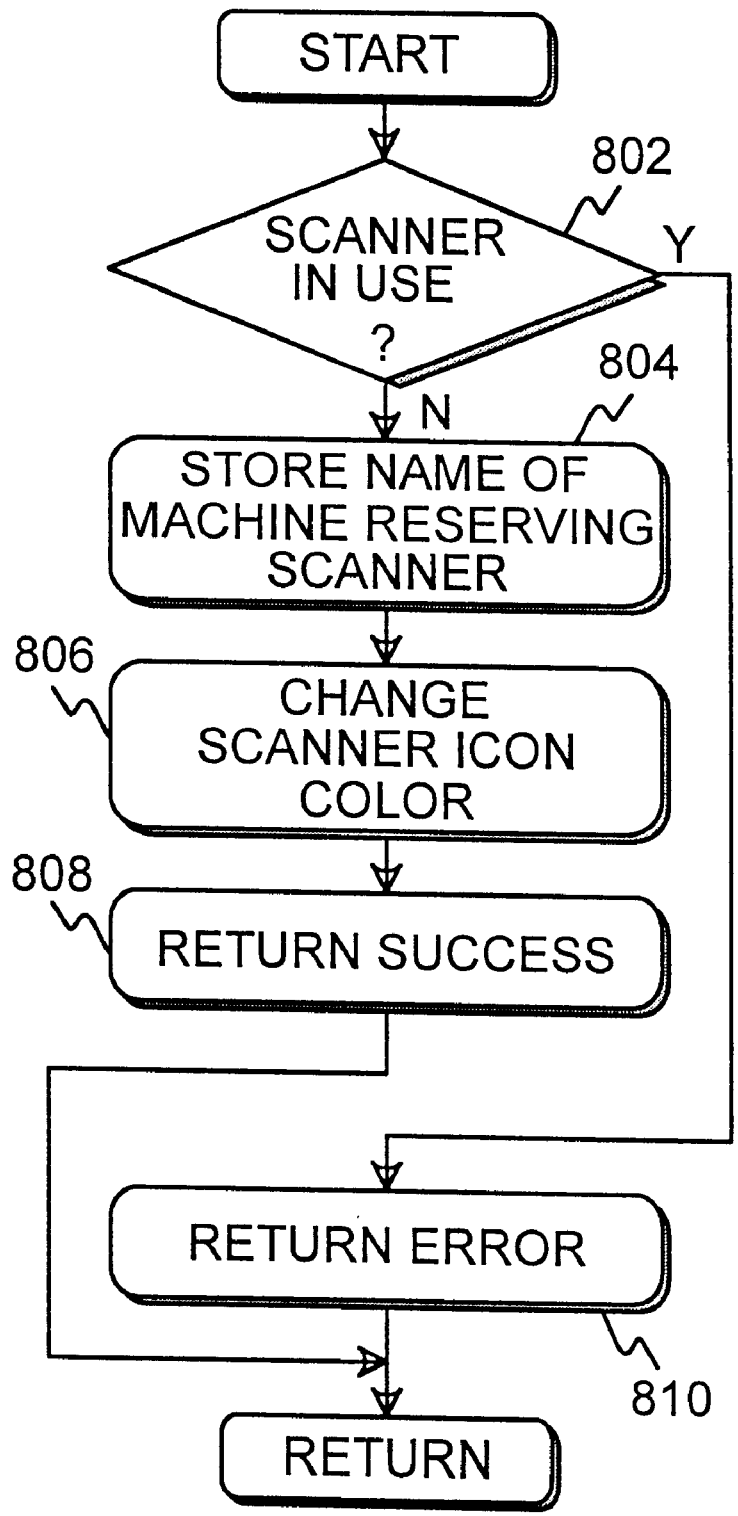
FIG. 8 shows a flowchart of the reserve scanner process on the server computer system.

One requirement of allowing multiple computer system to access a single scanner is that the scanner must be reserved for one of the computer systems. This is necessary because a scanner device can only be utilized to scan a single document at a time. Therefore, if two different computer systems were to access the same scanner, a single document would be scanned and returned to both systems, which is not the desired result. The present invention provides the ability to reserve a scanner to a particular computer system before the application program is allowed to use that scanner. FIGS. 7 and 8 show flowcharts of the modules within the computer system that is performing the reserving, and module within the remote computer system where the reserve scanner is located.

Figure 9:
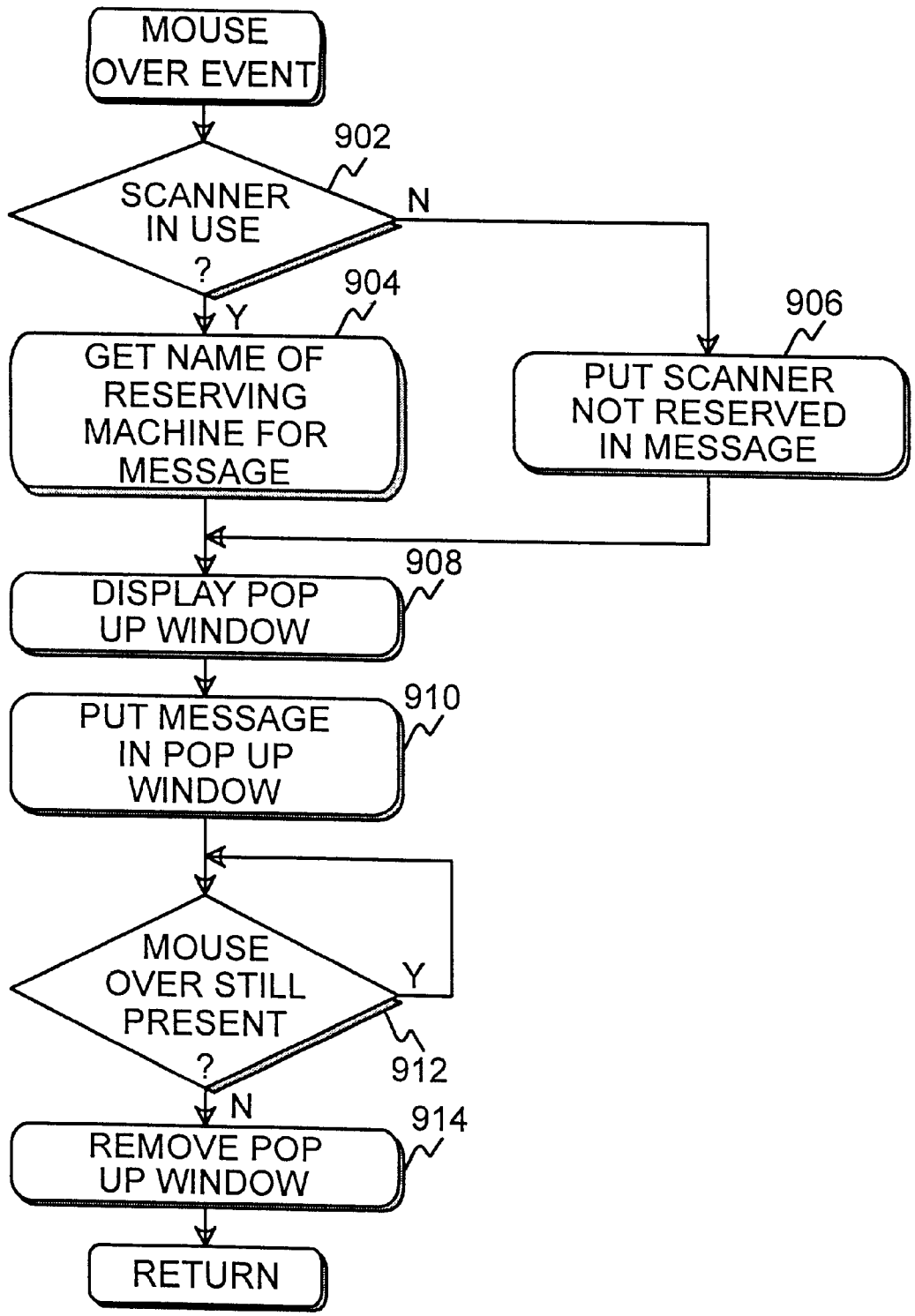
FIG. 9 shows a flowchart of the process of displaying the computer system name that has the scanner reserved.

Referring to FIG. 7, step 702 gets user input to select the remote scanner, as shown above with respect to FIG. 4. After getting the user input, step 704 calls the remote network server through remote procedure calls to request the reserve. The reserve function on the remote computer system is shown in FIG. 9, discussed below. After getting the results from the remote computer system, step 706 determines whether the reserve was successful, and if so, transfers to step 708 which displays the scanner reserve message, indicating that the scanner has been reserved, on the local computer system. If the reserve was not successful, step 706 transfers to step 710 which displays an error message telling the user that they are unable to reserve the scanner.

FIG. 8 shows a flowchart of the process being performed in the remote computer system when a scanner is being reserved. Referring now to FIG. 8, after entry, step 802 determines whether the scanner has been previously reserved by another computer system. If the scanner has been previously reserved, step 802 goes to step 810 which returns an error to the other computer system through the remote procedure call facility and the network. If the scanner had not been reserved, step 802 transfers to step 804 which stores the name of the computer system that is reserving the scanner. Typically, this information is stored in the registry of the local computer system that contains the scanner. Step 806 then changes the color of the icon representing the scanner on the local computer system. By changing the color of the scanner icon on the local computer system, a positive indication is provided to the user of the local computer system that the scanner has been reserved by a remote computer system. Thus the user of the local computer system, when they decide to perform a scan, will know whether the scanner has been reserved. If the scanner has been reserved, the user must either wait until the remote user has completed use of the scanner, or contact the remote user to ask them to release the scanner. As will be described below with respect to FIG. 10, by placing the mouse cursor over the scanner icon, the present invention will identify the remote user that has reserved the scanner.

After changing the icon color, step 808 returns a success indicator through the network to the remote computer system that was reserving the scanner.

The scanner is released when the user closes the application program that uses the scanner.

FIG. 9 shows a flowchart of the process of displaying the computer system name that has the scanner reserved. FIG. 9 is entered when a mouse over event occurs within the windows operating system. This event occurs for a window when the user moves the mouse cursor over the window. After the mouse over event is detected, step 902 determines whether the scanner is currently reserved by anyone, and if it is not, step 902 transfers to step 906 which puts a scanner not reserved text into the message that will be displayed. If the scanner is reserved, step 902 transfers to step 904 which gets the name of the computer system that has reserved the scanner, and puts this name in the message. Step 908 then displays a pop-up window near the scanner icon, and step 910 puts the message into the pop-up window. Step 912 then waits until the mouse has moved off the icon, and transfers to step 914 which removes the pop-up window.

Figure 10:
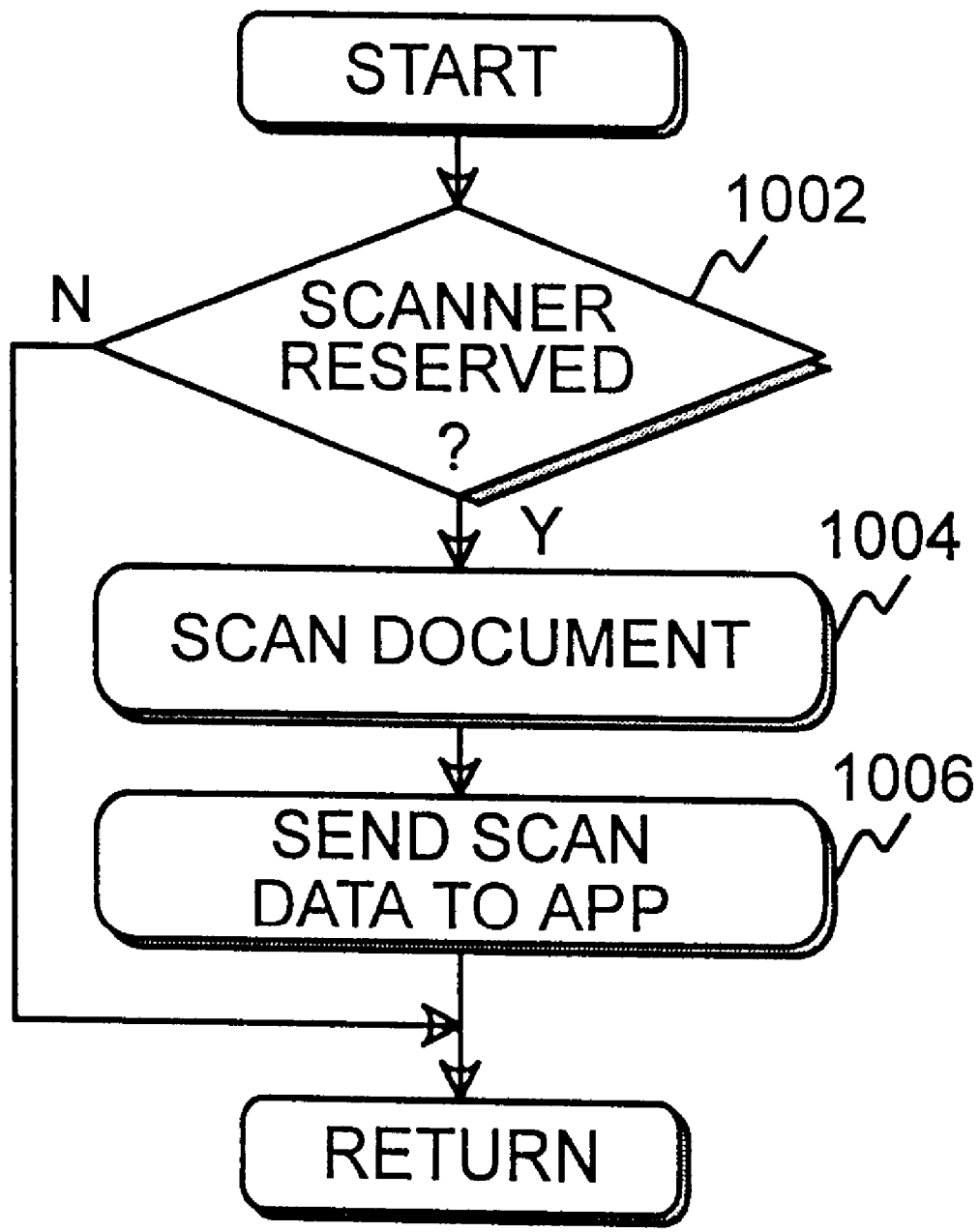
FIG. 10 shows a flowchart of the process of scanning a document and delivering it to an application when a scan switch is activated on the scanner.

FIG. 10 shows a flowchart of a feature of the invention that allows a document to be scanned when a button on the scanner is pressed. In this type of operation, a user would reserve a scanner and start an application program that sends a scan command to the scanner. The user would then go to the scanner, place a document in the scanner, and push a button located on the scanner. The scanner would detect the button push, scan the document, and return the data to the application.

Referring now to FIG. 10, after the user presses the button, step 1002 determines whether the scanner has been reserved and that a scan command has been received. If the scanner has not been reserved, or a scan command has not been received, step 1002 simply returns without doing anything. If the scanner has been reserved, and a scan command received, step 1002 transfers to step 1004 which scans the document and then step 1006 returns the scanned data to the application that had reserved the scanner.

In the same manner, a user can set a timer when reserving a scanner, and after the timer expires, the scanner will scan the document and return the data to the reserving computer.

Figure 11:
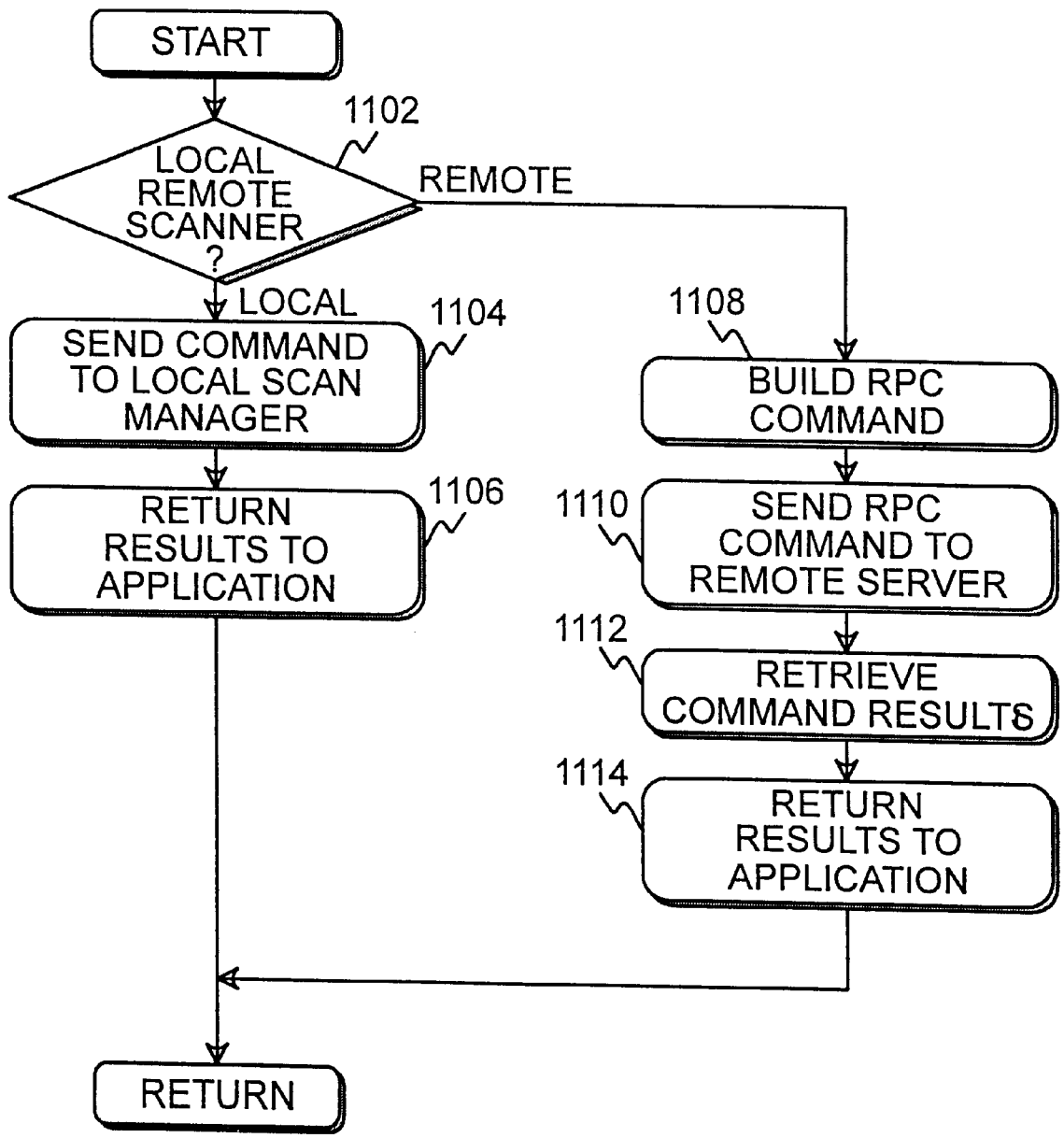
FIG. 11 shows a flowchart of the process of local or remote scanning.

FIG. 11 shows a flowchart of the process of FIG. 6, wherein commands are sent to a selected scanner. This flowchart depicts the process of the SCL 606 and network client 608. Referring to FIG. 11, when the application 604 (FIG. 6) sends a scan command to SCL 606 (FIG. 6) the process of FIG. 11 is entered. After entry, step 1102 determines whether the user had selected a local or remote scanner. If a local scanner has been selected, step 1102 transfers to step 1104 which sends the command directly to the local scanner. Step 1106 then returns the scanned data to the application program 604 (FIG. 6).

If the user has selected a remote scanner, step 1102 transfers to step 1108 which builds a Remote Procedure Call (RPC) command and step 1110 sends the RPC command to the remote computer where the scanner is located. Step 1112 retrieves the results of the scan from the remote computer system, and step 1114 returns the scanned data to the application program.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A computer implemented system for remotely scanning a document, the system comprising:

means within a local computer system for displaying a selection screen to allow a user to select a scanner located on a remote computer system;

means for sending a reserve request from the local computer system to the remote computer system, wherein the scanner is reserved for exclusive use of the local computer system;

means for starting a local application program in the local computer system;

means for receiving a scan command from the local application program and sending the scan command from the local computer system to the remote computer system;

means for scanning a document into the remote computer system from the scanner to produce scanned data;

means for returning the scanned data to the local computer system; and means for copying the scanned data into the local application program.

2. The system of claim 1 wherein the means for sending a reserve request further comprises:

means for determining, in the remote computer system, whether the scanner has been previously reserved by a second local computer system;

means for reserving the scanner for the local computer system when the means for determining whether the scanner has been previously reserved determines that the scanner has not been reserved by a second local computer system; and means for returning an error indication to the local computer system when the means for determining whether the scanner has been previously reserved determines that the scanner has been previously reserved by a second local computer system.

3. The system of claim 2 further comprising:

means for altering an appearance of an icon representing the scanner on a display device connected to the remote computer system, wherein an indication that the scanner is reserved is presented to a user of the remote computer system.

4. The system of claim 1 further comprising the step of:

means for displaying a name of the local computer system on the display screen of the remote computer system when a user of the remote computer system moves a cursor on a display screen of the remote computer system over an icon representing the scanner of the remote computer system.

5. The System of claim 1 wherein the means for scanning a document into the remote computer system further comprises:

means for delaying the scanning of the document until a signal is received indicating that a scan button has been pressed on the scanner.

6. The method of claim 1 wherein the means for receiving a scan command further comprises:

means for delaying the sending of the scan command for a time defined by a timer value set by the user, and sending the scan command after the amount of time specified by the timer value.

7. A method of remotely scanning a document, the method comprising the steps of:

(a) displaying a selection screen to a user on a local computer system to allow the user to select a scanner located on a remote computer system;

(b) sending a reserve request from the local computer system to the remote computer system, wherein the scanner is reserved for exclusive use of the local computer system;

(c) starting a local application program in the local computer system;

(d) receiving a scan command from the local application program and sending the scan command from the local computer system to the remote computer system;

(e) scanning a document into the remote computer system from the scanner to produce scanned data;

(f) returning the scanned data to the local computer system; and (g) copying the scanned data into the local application program.

8. The method of claim 7 wherein step (b) further comprises the steps of:

(b1) determining, in the remote computer system, whether the scanner has been previously reserved by a second local computer system;

(b2) when step (b1) determines that the scanner has not been reserved by a second local computer system, reserving the scanner for the local computer system; and (b3) when step (b1) determines that the scanner has been previously reserved by a second local computer system, returning an error indication to the local computer system.

9. The method of claim 8 wherein step (b2) further comprises the step of:

(b2a) after reserving the scanner for the local computer system, altering a color of an icon representing the scanner on a display device connected to the remote computer system, wherein an indication that the scanner is reserved is presented to a user of the remote computer system.

10. The method of claim 7 further comprising the step of:

(h) when a user of the remote computer system moves a cursor on a display screen of the remote computer system over an icon representing the scanner of the remote computer system, displaying a name of the local computer system on the display screen of the remote computer system.

11. The method of claim 1 wherein step (e) further comprises the step of:

(e1) delaying the scanning of the document until a signal is received indicating that a scan button has been pressed on the scanner.

12. The method of claim 1 wherein step (d) further comprises the step of:

(d1) delaying the sending of the scan command for a time defined by a timer value set by the user, and sending the scan command after the amount of time specified by the timer value.

13. A method of scanning a document, the method comprising the steps of:

(a) displaying a selection screen to a User on a local computer system to allow the user to select either a local scanner located on the local computer system or a remote scanner located on a remote computer system;

(b) when the user selects a remote scanner in step (a) sending a reserve request from the local computer system to the remote computer system, wherein the scanner is reserved for exclusive use of the local computer system;

(c) when the user selects a local scanner in step (a), reserving the scanner attached to the local computer sytem;

(d) starting a local application program in the local computer system;

(e) receiving a scan command from the local application program;

(f) when the local scanner has been selected, sending the scan command to the local scanner;

(g) when the local scanner has been selected, retrieving scanned data from the local scanner and proceeding with step (k);

(h) when the remote scanner has been selected, sending the scan command from the local computer system to the remote computer system over a computer network;

(i) when the remote scanner has been selected, scanning a document into the remote computer system from the scanner to produce scanned data;

(j) when the remote scanner has been selected, returning the scanned data to the local computer system; and (k) copying the scanned data into the local application program.

* * * * *

UNITED STATES PATENT AND TRADEMARK OFFICE
CERTIFICATE OF CORRECTION

| | | |
|---|---|---|
| PATENT NO. | : 6,167,462 | Page 1 of 2 |
| DATED | : December 26, 2000 | |
| INVENTOR(S) | : Kenneth P. Davis et al. | |

It is certified that error appears in the above-identified patent and that said Letters Patent is hereby corrected as shown below:

<u>Column 1,</u>
Line 4, before "DISCLOSURE" insert
-- TECHNICAL FIELD
   This invention relates to optical scanners and more particularly to sharing optical scanners on a computer network. Even more particularly, the invention relates to a software solution for sharing optical scanners on a computer network.
   BACKGROUND OF THE INVENTION
   One advantage of connecting personal computers together over a computer network is the ability to share peripheral devices, such as laser printers and fax machines. Instead of each computer having its own dedicated peripheral device, one peripheral device attached to a network may be accessed by any computer located on the same network. Though it is old in the art to share some peripheral devices, not all devices can be shared.
   Kofax Image Products has taken a primarily hardware oriented solution to sharing optical scanners on a computer network by attaching a hardware device called a scan server to an optical scanner. The scan server is then connected to the network. Software of the scan server is loaded onto a computer attached to the network. By accessing the scan server software from the computer on the network the user can scan a document with the optical scanner, and, through the scan server and software, direct the document to different destinations, such as to a storage disk, to a fax machine, to a laser printer, or to a selected destination using e-mail or the Internet. Though sharing of the optical scanner is accomplished with this solution, it requires the purchase and installation of an expensive piece of hardware, the scan server.
   Another solution to sharing optical scanners on a computer network involves a software only approach taken by UMAX Technologies, Inc. Using custom developed protocols, UMAX can provide multi-client multi-server sharing of its Vista-S12 optical scanner on networking systems that support NET BIOS, such as Novell, Windows for Workgroups, and LAN Manager. However, this approach is limited to 16 bit processing and does not support other protocols.
   It is thus apparent that there is a need in the art for an improved method of sharing an optical scanner on a network that does not rely on special hardware for functionality. There is also a need in the art for a software solution that will support 32 bit processing and which will support the wider range of protocols available on today's most common operating systems, such as Windows 95 and Windows NT. The present invention meets these and other needs in the art. --

UNITED STATES PATENT AND TRADEMARK OFFICE
CERTIFICATE OF CORRECTION

PATENT NO. : 6,167,462
DATED : December 26, 2000
INVENTOR(S) : Kenneth P. Davis et al.

It is certified that error appears in the above-identified patent and that said Letters Patent is hereby corrected as shown below:

<u>Column 8,</u>
Line 22, delete "User" and insert therefor -- user --

Signed and Sealed this

Twenty-second Day of October, 2002

*Attest:*

*Attesting Officer*

JAMES E. ROGAN
*Director of the United States Patent and Trademark Office*